July 21, 1964     H. H. KAUFMANN ETAL     3,141,776
PREPARATION OF A CEREAL-FULL FAT SOYBEAN FOOD PRODUCT
Filed Oct. 25, 1961
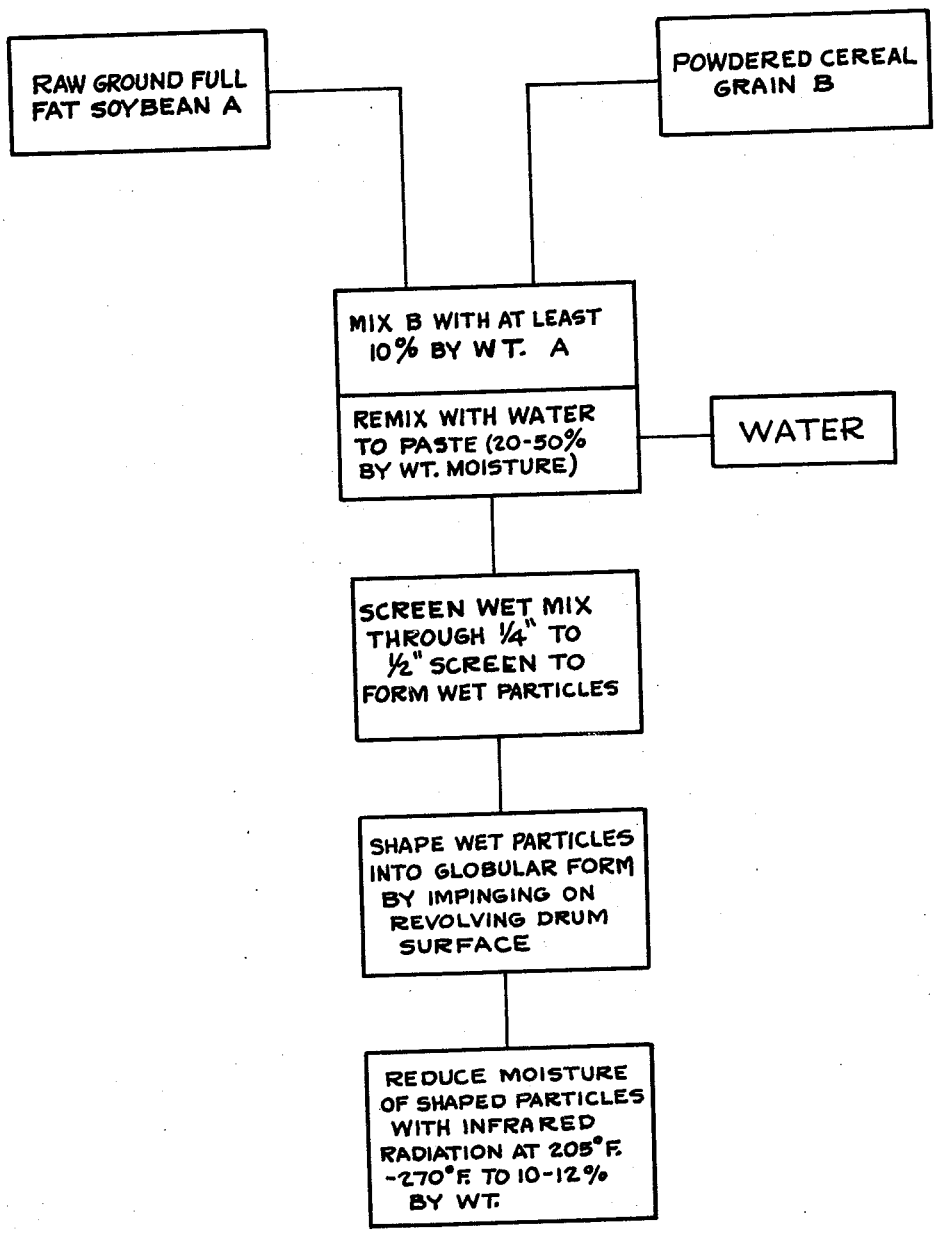
Inventors:
Henry H. Kaufmann
and James F. Lawrence

United States Patent Office 3,141,776
Patented July 21, 1964

3,141,776
PREPARATION OF A CEREAL-FULL FAT
SOYBEAN FOOD PRODUCT
Henry H. Kaufmann and James F. Lawrence, Minneapolis, Minn., assignors to Cargill, Incorporated, Wilmington, Del., a corporation of Delaware
Filed Oct. 25, 1961, Ser. No. 147,511
4 Claims. (Cl. 99—80)

The present invention generally relates to food products and more particularly relates to a method of making a cereal-containing food product and the product of the method. The method particularly relates to utilization of full fat soybeans in a cereal mix and provision of a finished product comprising discrete granular particles having improved nutritional value, flavor and digestibility.

A wide variety of cereals and cereal feeds, both for human and animal consumption, are commercially available. They are provided in various forms, including mash (substantially powdered), pellets and small particles. The pellets usually have a substantially reduced rate of water absorption and, accordingly, retain their form for a considerable period of time in the presence of water. Pellets are usually relatively more expensive to produce than mash, due to additional processing steps, such as shaping and pressing, etc. However, it has been found that for purposes of handling, feeding and storage in many instances there are substantial advantages in the production of and the use of pelletized or granular-type feeds rather than the powdered or mashed form.

It has further been found to be desirable in many instances to provide a granular food product prepared from a cereal or cereal mix, which product has substantial water absorptivity. Thus, the particles, upon contact with water, readily and rapidly absorb large quantities thereof. In so doing, the particles more readily release the flavor and aroma of the cereals in the feed, making the feed more appetizing and palatable. Thus, for example, several dog food products are now manufactured in what is called "crumbled" form. This "crumbled" form of feed generally has a substantially greater rate of water absorptivity than the pellets. However, many "crumbled" feeds, in absorbing large quantities of water, tend to lose their particulate form. Instead, the particles swell and stick together, assuming somewhat the form of wet mash. In such form, they tend to lose their appetizing appearance and become more difficult to eat.

It would be desirable to provide such granular or crumbled type cereals with the ability to retain their granular or discrete particulate form, while absorbing water, to make them more flavorful and appetizing. It would further be of advantage to provide the particles with a smooth regular surface for improved appearance, instead of the broken or irregular appearance of conventional crumbled cereals.

It is also desirable to provide a highly nutritious palatable cereal mixture. Present feed mixing procedures usually require that some type of binder be used to keep the cereal mix in suitable particulate form until the mix is set, as by heating. However, the usual cereal binder does not contribute to but, instead, tends to dilute or decrease the palatability and nutritional value of the food. Accordingly, it would be advantageous to employ as a binder a highly nutritional material which contributes to increased palatability of the feed, provided the binder has suitably effective binding qualities during preparation of the cereal product.

An improved method of making a food product has now been discovered which includes the use of a selected binding agent which has a high nutritional value, particularly in protein value, and which, when treated in accordance with the method of the present invention, not only performs effectively as a binding agent, but also increases the palatability and the digestibility of the product.

Furthermore, the method of the present invention can provide a finished cereal with an improved distinctive appearance, the particles being smooth and rounded yet capable of rapidly absorbing large quantities of water while retaining their integrity and appearance. They do not readily agglomerate, disintegrate or otherwise deteriorate to provide a wet mash appearance. It has been discovered that highly nutritional full fat soybean when incorporated with other cereal grain or, if desired, when used by itself has highly effective binding properties rendering it suitable for use in the preparation of improved cereal in particles which readily absorb moisture but which do not undergo substantial disintegration.

Accordingly, it is a principal object of the present invention to provide an improved method of making a food product and an improved food product. It is also an object of the present invention to provide an improved cereal food product in particulate form incorporating a nutritional binder. It is a still further object of the present invention to provide a method of making cereal food having improved distinctive form and appearance and which is capable of readily absorbing water without substantial agglomerating or disintegrating. It is also an object of the present invention to provide an improved cereal product which incorporates a substantial concentration of a binder rich in protein and fat, which binder improves the palatability, flavor, aroma and nutritional value of the cereal product.

Further objects and advantages of the present invention will be apparent from a study of the following description and the accompanying drawing in which:

A schematic flow diagram is shown depicting the steps of a preferred embodiment of the method of the present invention.

The present invention generally comprises a method of making an improved particulate cereal food product which method includes forming the product from cereal grain and ground full fat soybeans, the latter being in a sufficient concentration to act effectively as a binding agent for the cereal grain. As used herein, the term "full fat soybean" refers to soybeans which have not been substantially defatted by removal of oil from the beans, whether or not they are ground.

The mixture is moistened and discrete particles are formed. The particles are then worked to desired shape. The moisture content of the shaped particles is reduced to a controlled level and the particles are cooled. The soybeans, in accordance with the process of this invention are subjected to heat treatment which inhibits toxic effects of full fat soybeans.

Now considering the steps of the method of the present invention more particularly, cereal grain, cooked or uncooked, is mixed together. The cereal grain may comprise one or more types of grain, i.e., corn, oats, rice, wheat, sorghum, etc. for animal and/or human consumption. Any cereal grain that is conventionally used as an animal or human cereal feed can be employed in the method of the present invention. The grain is initially in fine particulate form, preferably in the form known in the art as "mash." To the cereal grain or mixture of grains, is added, if not already present, ground full fat soybean, either cooked or raw, in particulate form, preferably small enough to pass through a 100 mesh screen and in an amount sufficient to bind the cereal effectively together during the subsequent processing steps. The soybean concentration should be at least about 10 percent, by weight of the cereal. If desired, the cereal can include up to 100 percent, by weight, of the soybean.

It has been found to be necessary for the purposes of the present invention that substantially all of the soybean oil naturally occurring in soybeans be present in the soybeans for use, in cooperation with other constituents of the soybeans, in providing the desired binding properties. The soybeans may be raw, that is, uncooked. Instead, if desired, full fat natural soybeans which have been previously subjected to a heat treating or cooking procedure can be used. In any event, the soybeans must be subjected to a heat treating step prior to utilization of the product of the invention. The heat treating should be accomplished at a temperature below about 270 degrees F. and, furthermore, at a moisture concentration initially in the soybeans of at least about 8 percent, and the final concentration at least about 7 percent, so as not to materially depreciate the nutritional value thereof, particularly the protein dispersibility thereof. In addition, the heat treatment of the invention will assure inhibition of toxic factors in the soybeans, including the soyin and trypsin inhibitors, and minimizing of factors contributing to or causing the raw beany flavor in soybeans.

It is important that the heat treatment be carried out within the prescribed limits and we have found that the use of infra-red radiation is required so that substantial depreciation in the nutritional value and oil content of the soybean does not occur.

The cereal grain and full fat soybean can be mixed in any suitable manner. In accordance with the method of the present invention, the resultant cereal mixture is mixed with a concentration of water sufficient to form the mixture into a workable pasty mass. It has been found that for most purposes, the total moisture concentration of the mixture should be increased to at least about 20 percent, by weight, and preferably up to about 50 percent, by weight, of the entire mass. A conventional high speed paddle mixer is satisfactory for the initial mixing and for the mixing of the mixture with water. The water can be slowly added to the cereal mix in the paddle mixer while the mixer is in operation. Usually, only a few seconds are necessary in order to completely blend in the water and provide the desired workable pasty mass.

Thereupon, in accordance with the method of the present invention, discrete particles are formed in any suitable manner from the mass. The forming operation preferably is carried out by passing the pasty mass through a suitable screen, having, for example, holes of ¼ inch or other suitable size. A screen with ¼ inch diameter perforations is particularly suitable for use with pasty masses having less than about 30 percent, by weight, moisture. The screen is preferably located in the inlet to a shaping zone which preferably comprises a revolving drum.

The wet pasty particles, of suitable size, are passed, in accordance with the present invention, into the shaping zone and therein are shaped into substantially globular form without, however, a substantial increase in the density thereof, i.e., under non-pelletizing conditions and while substantially maintaining high water absorptivity. The density, surface characteristics, shape and size of the particles can be effectively controlled in the shaping zone.

In the shaping zone, the wet particles are preferably shaped by passage through the described revolving drum. The drum is preferably set so that its axis is at a slight angle with horizontal, for example, from about 5 degrees to about 15 degrees, to aid in the rapid shaping of the particles. Angles of from about 0.5 to 20 degrees or more are also suitable, with angles of between about 10 degrees and 15 degrees being preferred.

As the drum rotates, the moist particles are rolled along the inner surface of the drum. The rolling of the discrete particles against the drum surface tends to round and smooth the particles.

It will be understood that the shaping can be carried out in other ways to provide the desired results.

As an example of the preferred manner of carrying out the shaping, wet particles of cereal, suitably sized by passing through a ⅜ inch screen set in the entrance of a hollow open ended drum having a diameter of about 36 inches and revolving at about 40–50 revolutions per minute, are passed through the drum. The drum is set at an angle of 5–10 degrees from the horizontal. Under such circumstances, usually approximately 90 percent of the presized wet particles passing through the drum are formed into the desired smooth, rounded granules of approximately ¹⁄₁₆ to ¼ inch size in a single pass through the drum. The remainder of the wet mix not so formed can be recycled, preferably into the mixing operation and can re-enter the drum after passing through the presizing screen. The concentration of wet particles which are not immediately shaped into the desired smooth globular form will somewhat depend upon the particular moisture concentration, the particular wet mix formulation, the rate of feed and other processing conditions. Cereal mixes having soybean concentrations of about 14 or 15 percent, by weight, usually exhibit a minimum amount of difficulty in rapidly forming the desired globular particles, especially when they have moisture concentrations of between about 25 percent and about 45 percent, by weight. However, it will be understood that other soybean concentrations of at least about 5 percent, by weight, and other moisture concentrations in the wet mix are also suitable for the purposes of the present invention.

Drum speeds have varied considerably, as well as drum sizes. In this connection, it has been found suitable to use, for example, drums of 18 inches, 36 inches and other diameters, and drum speeds, for example, of 20 to 60 r.p.m. The through-put rate of the wet mix during the shaping can also vary considerably. Satisfactory results have been obtained with through-put rates as low as 4.5 pounds per minute through a 36 inch drum revolving at about 26 r.p.m. Alternatively, through-put rates as high as 40 pounds per minute have also been found to be satisfactory with higher drum speeds. It has further been found that the drum length, that is, the minimum length for the particle shaping zone, can vary. For most purposes, on the basis of the usual residence times encountered in accordance with this step, the length of the shaping zone can be about 2 to 3 feet or more. It will be understood that the drum length can be suitably varied to control the size, firmness and density of the globular particles. Good results have been obtained with, for example, drum lengths as high as 6 feet or more with the previously indicated through-put rates.

As previously indicated, the shaping is carried out in a manner such that the initial moisture absorptivity of the cereal is substantially maintained. This can be readily accomplished in accordance with the foregoing preferred procedure utilizing the revolving drum, indicated through-put rates and other conditions.

After the particle shaping is completed, the particles are passed into a heat treating and/or drying zone. Inasmuch as the cereal generally equilibrates with atmospheric conditions at about 8 to 9 percent, by weight, moisture, there is no particular advantage in reducing the moisture content to below that level during the drying step. Furthermore, it has been found that if the moisture concentration is reduced below about 7 percent, by weight, of the cereal, and/or high drying temperatures are employed, burning of the grain may occur. Of even more importance, a substantial reduction in the protein dispersibility and, accordingly, the nutritional value of the soybean and other cereal may occur. The protein dispersibility is a standard term in nutrition and is a measure of the degree of availability of protein for digesting. Protein dispersibility values of 50 and above indicate that a substantial amount of protein present in a food can be readily digested in a reasonably short period of time and, hence, is of nutritional value. For the purposes of the present invention, the drying step is limited to a minimum moisture concentration in the feed of at least about 7 percent, by weight. Preferably, the final moisture content of the globular particles is between about 10 and about 12 percent, by weight. The drying operation also is preferably not carried out at a temperature of more than about 270 degrees F. Higher temperatures are difficult to control with respect to burning, reduction in protein dispersibility, etc. Accordingly, for the purposes of the present invention, the drying step is not carried out at a temperature in excess of 270 degrees F. Drying temperatures lower than about 205 degrees F., although otherwise suitable, result in too slow drying to be commercially practical, in the absence of special conditions, such as a vacuum, etc. Accordingly, for the purposes of the present invention, the drying step is preferably carried out at between about 205 degrees F. and about 270 degrees F.

In the event that raw ground full fat soybeans are used, instead of heat treated full fat soybeans, or in the event that the full fat soybeans have been previously cooked in a manner which did not inhibit the toxic factors therein and at least substantially reduce the raw beany flavor thereof, the drying step must be carried out in a manner which assures substantial inhibition of the toxic factors naturally occurring in raw soybeans. The drying step should be carried out in a manner such that the flavor of the soybeans is substantially improved by imparting thereto a desirable toasty or nut-like flavor.

It has been found that these objects can be most readily accomplished during the heat treating or drying step by employing infra-red radiation. When the infra-red radiation is employed, the initial moisture content of the particles should be sufficiently high so that a sufficiently long irradiation time can be employed to bring about the described change in toxic factors and reduction or elimination of the beany flavor of the soybean, without lowering of the total moisture content below about 7 percent, by weight. In this connection, the moisture concentration in the particles immediately before drying should be at least 8 percent and preferably should be at least about 19 percent by weight. Most preferably, the moisture content is between about 20 and about 40 percent, by weight. The infra-red irradiation should, of course, be controlled to provide heat treatment within the described temperature range of from about 205 degrees F. to about 270 degrees F. Infra-red radiation can be carried out utilizing any suitable apparatus, for example, an infra-red generating gas burner utilizing a ceramic grid operating at about 1650 degrees C. Preferably, the infra-red radiation should have a peak wave length of between about 2 microns and about 6 microns for maximum effectiveness in inhibiting the toxic factors in the soybean.

The heat treatment time can be readily controlled and depends upon the initial moisture content, the concentration of soybeans present, the size of the particles, the heat treatment temperature, etc. However, for most purposes, the heat treatment utilizing infra-red radiation can be carried out in between about 4 minutes and about 15 minutes to achieve the desired results. Moreover, the soybean is converted thereby to a nutritious palatable product, with a toasted nut-like flavor. In addition, the soybean retains its strong binding properties so that the particles do not readily disintegrate. The toxic and flavor depreciating factors of the soybean are minimized in the soybean by the heat treatment. A particular method whereby infra-red radiation accomplishes the desired transformation in the soybeans to soybeans having high nutritional value and high protein dispersibility, has been disclosed in detail in co-pending application Serial No. 144,503, filed October 11, 1961.

After the drying step, the dried particles can be immediately stored and bagged, or allowed to cool and then stored and bagged. The finished cereal food product thus obtained is distinctive in appearance, comprising a plurality of smooth approximately spherical or globular particles, which have controlled density and moisture absorptivity. The particles remain in substantially their original form during subsequent handling operations, including bagging, and in the presence of water for considerable periods of time. Furthermore, the cereal food product has high nutritional value, in view of the substantial concentration of soybeans therein having substantially all of the natural concentration of soybean oil retained therein and in view of the high protein dispersibility thereof. Moreover, the product is highly palatable and readily releases a toasty aroma, when mixed with water. Feed tests on various types of animals, including poultry, swine and cows, have shown that the product has high feeding efficiency, depending upon the particular formulation, in terms of pound of feed per pound of weight gained.

The following example further illustrates certain features of the present invention.

A wet feed mix having the following formula is made up in a paddle mixer:

*Table*

| Constituents: | Pounds |
| --- | --- |
| Corn, ground | 25.8 |
| Raw, ground, full fat soybean | 14.2 |
| Water | 3.0 |

The mixing operation is carried out in a paddle mixer in which the mixture resides about 30 seconds. The mix is then passed to a pre-mixing screen fitted into the entrance of the open ended revolving 36 inch diameter drum. The screen and drum are rotating at about 26 r.p.m. and the screen has ⅜ inch diameter perforations therein. The wet feed is passed through the screen, approximately 50 percent thereof immediately forming particles. The length of the drum is approximately 6 feet. The granules roll along the inner surface of the drum and are rounded into smooth balls or spheres. The drum is supported with its axis at an angle of about 5 degrees from the horizontal to facilitate the granule shaping operation.

The shaped granules exit from the drum onto a vibrating conveyor and are immediately passed under a bank of infra-red radiation heaters utilizing Swank ceramic grids operating at about 1650 degrees C. As the granules on the vibrating conveyor belt pass under the infra-red radiation heaters, they are dried from a moisture concentration of about 30 percent by weight down to a moisture concentration of between about 10 and about 12 percent, by weight, at a temperature of about 246 degrees F. The conveyor vibrates in order to minimize agglutination of the granules before the drying step. By the end of the drying step, the particles are sufficiently dried so that agglutination does not occur. Thereupon, the particles are cooled and passed to storage.

The finished cereal food is of distinctive appearance, has a suitable toasted flavor without a beany soybean flavor, substantially is free of toxic factors, and upon testing, exhibits a protein dispersibility of at least about 55 percent. The particles are easy to handle, resist crumbling in the dry state, yet absorb moisture rapidly without disintengration or agglomeration so that feeding immediately after mixing with water can be carried out. They can also be eaten dry.

The foregoing example clearly illustrates certain advantages of the method of the present invention. In this connection, an improved food product is provided, having improved appearance, palatability and nutrition. Moreover, the product has certain characteristics which contribute to its superior eating qualities. The method of making the product is rapid, relatively simple, effective and low cost. Further advantages of the present invention are set forth in the foregoing.

Various features of the present invention are set forth in the appended claims.

What is claimed is:

1. The method of making an improved particulate food product which method comprises the steps of mixing together ground cereal grain and a binder of full fat soybeans in an amount of at least about 5 percent by weight of said cereal grain, moistening said mixture to provide a workable pasty mass, forming discrete particles from said mass, shaping said particles under non-pelletizing conditions without substantially reducing the water absorbing characteristics thereof, heat treating said particles with infra-red radiation at a temperature below about 270° F. for a period of time generally equivalent to heat treating at about 270° F. for about 4 minutes to substantially destroy the toxic and inhibitory factors in said soybeans, and terminating said heat treating before the moisture concentration of said particles falls below about 7 percent by weight, whereby an improved full fat soybean containing food product is obtained which has a toasted nut-like flavor and high protein dispersibility.

2. The method of making an improved particulate food product, which method comprises the steps of mixing together ground cereal grain and a binder of full fat soybeans in an amount of at least about 10 percent by weight of said cereal grain, adding water to the mixture formed and forming a pasty mass having a moisture content of at least about 20 percent by weight, forming discrete particles from said mass, shaping said particles to substantially globular form under non-pelletizing conditions without substantially reducing the water absorbing characteristics thereof, heat treating said particles at a temperature of about 205° F. to about 270° F. with infra-red radiation for a period of time generally equivalent to heat treating at about 270° F. for 4 minutes to substantially destroy the toxic and inhibitory factors in said soybeans, terminating said heat treating before the moisture content of the particles falls below about 7 percent by weight, and cooling said particles to form a finished food product having an increased nutritional value and distinctive particulate form.

3. The method of making an improved particulate cereal product, which method comprises the steps of mixing together ground dried cereal grain and a binder of ground full fat soybeans in an amount of at least about 10 percent by weight of said cereal grain, moistening said mixture and forming a workable pasty mass having a moisture content of at least about 20 percent by weight, forming wet discrete particles from said mass, shaping said particles to substantially globular form under non-pelletizing conditions without substantially reducing the water absorbing characteristics thereof, heat treating said particles with infra-red radiation at a temperature of about 205° F. to about 270° F. for a period of time generally equivalent to heat treating at about 270° F. for about 4 minutes to substantially destroy the toxic and inhibitory factors in said soybeans without substantially reducing the dispersibility of the protein therein, terminating the heat treating before the moisture content of said particles falls below about 10 percent by weight, and cooling said particles to form a finished improved cereal product having particulate form and increased nutritional value, including protein dispersibility of at least about 50 percent.

4. The method of making an improved particulate cereal product, which method comprises the steps of mixing together ground uncooked cereal grain and a binder of raw full fat soybeans in an amount of at least about 10 percent by weight, moistening said mixture with water and forming a workable pasty mass having a moisture concentration of between about 20 and about 50 percent by weight, forming said mass into discrete wet particles, shaping said particles to substantially globular form under non-pelletizing conditions without substantially reducing the water absorbing characteristics thereof, reducing the moisture content of said particles to between about 10 and about 12 percent by weight at a temperature of between about 205° F. and 270° F. by irradiating said particles with infra-red irradiation having a peak wave length of between about 2 microns and about 6 microns for a period of time generally equivalent to heat treating at about 270° F. for about 4 minutes to substantially destroy the toxic and inhibitory factors in said soybeans without reducing the dispersibility of the protein therein to below about 50 percent, and cooling said particles to form a finished improved particulate cereal product having improved nutritional value, digestibility and palatability.

References Cited in the file of this patent

UNITED STATES PATENTS 2,436,519    Luke _____ Feb. 24, 1948

OTHER REFERENCES

Food Engineering, vol. 27, No. 6, June 1955, page 58.

Von Loesecke: Drying and Dehydration of Food 1943, pp. 18 and 19, Reinhold Publishing Corp., New York.

Jacobs: Chemistry and Technology of Food and Food Products, vol. II, 1951, page 1120, Interscience Publishers, Inc., New York.